Jan. 27, 1959 J. G. McQUEEN 2,871,471
GAIN CONTROL
Filed Sept. 22, 1950 2 Sheets-Sheet 1
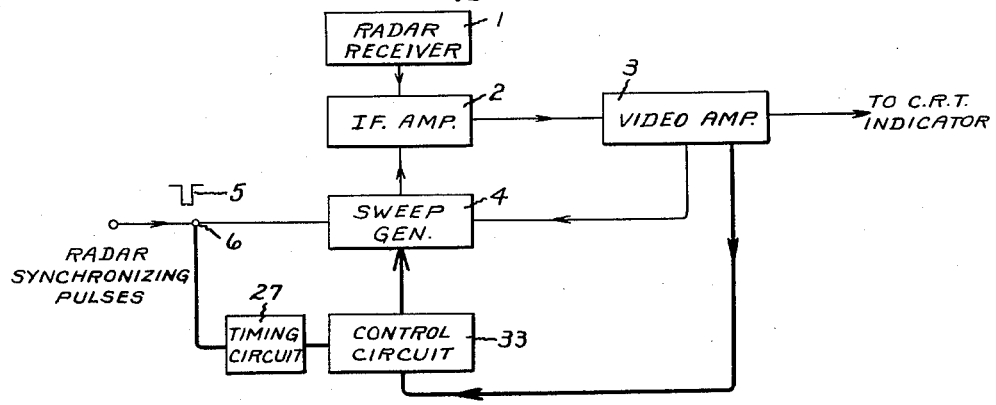
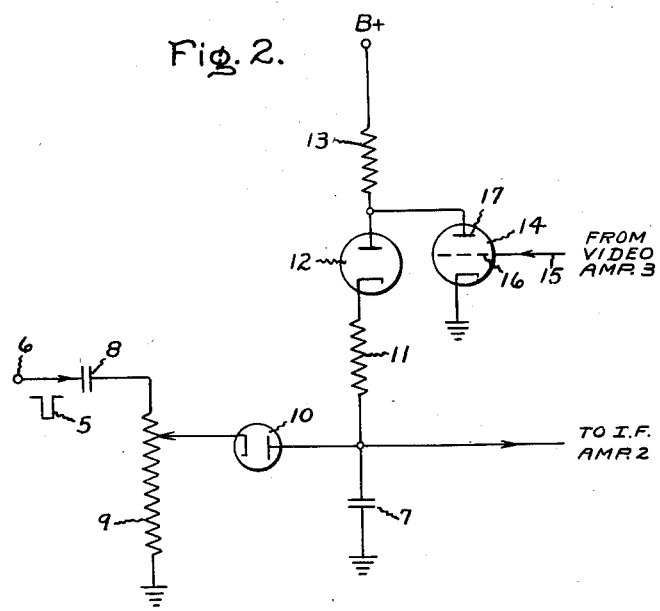
Inventor
Jack G. McQueen
by Merton D. Moore
His Attorney Jan. 27, 1959   J. G. McQUEEN   2,871,471
GAIN CONTROL
Filed Sept. 22, 1950   2 Sheets-Sheet 2
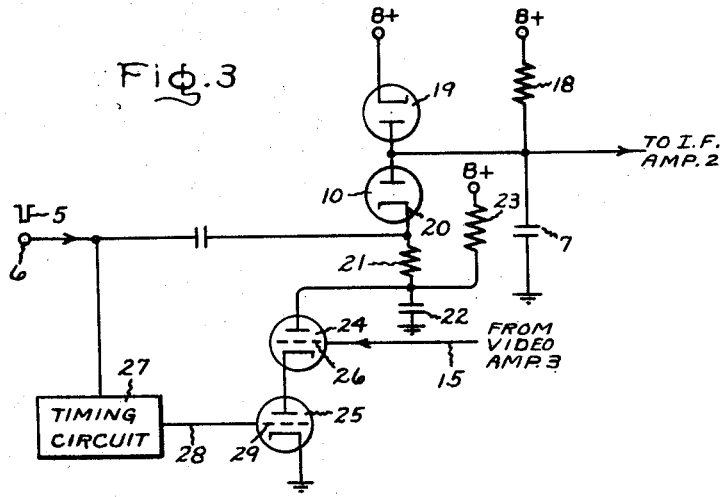
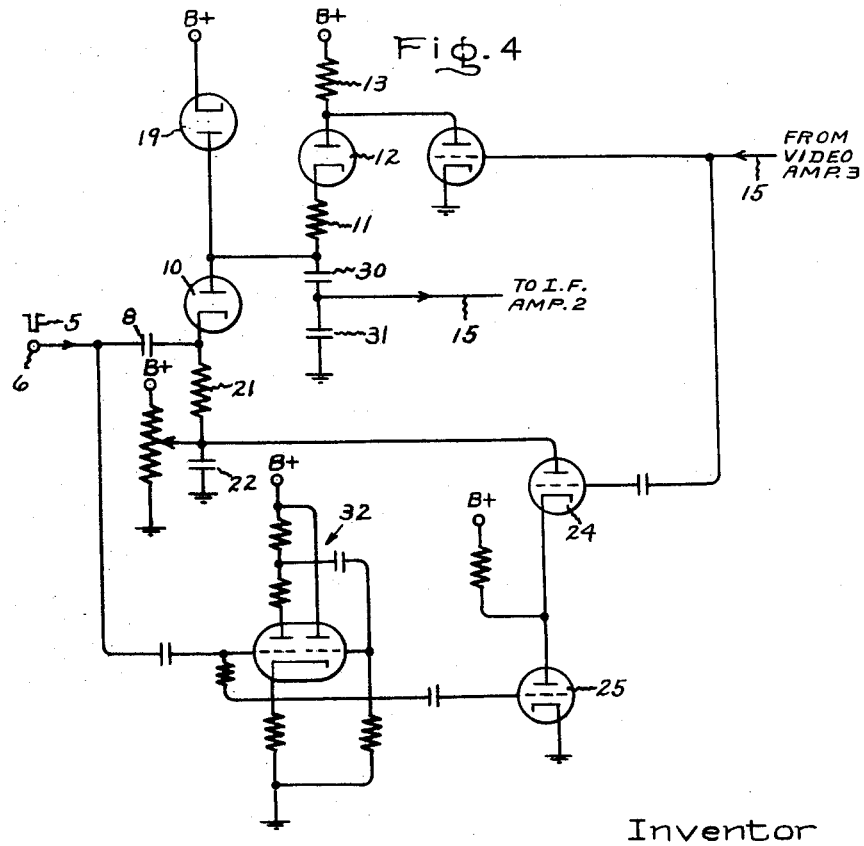
Inventor
Jack G. McQueen
by Merton D Moore
His Attorney

United States Patent Office

2,871,471
Patented Jan. 27, 1959

2,871,471
GAIN CONTROL

Jack Gordon McQueen, Sale, England, assignor to General Electric Company, a corporation of New York Application September 22, 1950, Serial No. 186,249

Claims priority, application Great Britain September 26, 1949

14 Claims. (Cl. 343—17.1)

This invention relates to radar equipment and has an important application in marine radar equipment for use on ships or on land stations operating over the sea. With such equipment it is possible in a choppy sea to experience considerable interference and clutter due to echoes from the waves.

In order to obtain sensivity, radar receivers normally have high amplification with output limitation and it follows therefore that in a moderately choppy sea signals from waves can produce considerable clutter on the screen of the cathode ray tube. This is particularly troublesome at relatively short ranges, for example up to, say, two miles where clutter from waves can easily obscure signals from objects such as ships or buoys even although the strength of echoes from the latter is very much greater than that of the sea clutter.

One way of discriminating between signals from waves and signals from required targets such as ships is to reduce the gain of the receiver so as to reduce the sea clutter to a negligible amount on the screen; larger signals will then appear clearly. As, of course, the effect of the clutter will be dependent on the range of the waves producing the clutter as well as the state of the sea it follows that the gain of the receiver should vary according to range, and to obtain this result a method of control has been employed known as swept gain in which during each reception period a sweep voltage is applied to the receiver so that initially, that is for short ranges, the gain is considerably reduced but progressively increases as the range increases so that the sensivity is less at short ranges and the short range clutter due to waves etc. is reduced.

While such an arrangement appreciably improves the reception, it follows that to obtain a good display the manner in which the gain increases with range may need to vary as conditions vary. As the change in conditions may be fairly rapid, clearly it is impracticable adequately to effect such adjustment manually.

An object of the invention is to provide an arrangement permitting improved reception of desirable radio signals by a radio receiver operating in the presence of undesirable signals.

Another object of the invention is to provide an improved swept gain control for radar receivers.

Another object of the invention is to provide means for controlling the swept gain of a radar receiver in accordance with the receiver output.

Another object of the invention is to provide means for controlling the instantaneous swept gain of a radar receiver in accordance with the instantaneous output of the receiver.

Another object of the invention is to provide means for controlling the shape of the swept gain control voltage of a radar receiver in accordance with only a sampled portion of the receiver output.

The present invention comprises radar equipment having means for generating a recurrent sweep voltage which is applied to the receiver to effect swept gain control, characterized in that means are provided for automatically varying the swept gain in accordance with clutter reception conditions.

In carrying out the invention in cases in which the swept gain is controlled by the charging or discharging of a condenser the rate of charging or discharging, as the case may be, may be controlled in accordance with instantaneous reception conditions.

Such an arrangement enables the gain to be automatically maintained at the correct level from instant to instant during each sweep. It will also be appreciated that the circuit should be adjusted so that when the condenser is charging or discharging at the full rate, that is, in the absence of any retarding effect due to reception of signals, the rate of increase in gain will be much greater than will normally be required.

It will also be appreciated that in many cases it may be desirable to vary the initial value of gain from which the sweep commences in accordance with the general conditions prevailing and this may be effected by varying the initial value of the sweep voltage in accordance with existing conditions. To this end there may be provided means responsive to the short range reception occurring over a relatively short period following each transmitted pulse for controlling the value of the initial gain from which the sweep commences automatically in accordance with said short range reception.

With such an arrangement the time integral of the reception over a relatively short initial period, say three microseconds, may be employed to vary the initial gain of the receiver. It will be appreciated that the short range reception is taken as indicative of the general state of the sea. In order to prevent obstacles such as buoys and the like from unduly affecting the time integral of the signals, it is preferable to limit the maximum value of the control signals varying the gain of the receiver so that the effect of unduly large signals due to such obstacles is reduced, preferably down to the neighborhood of the noise level.

The novel features which I believe to be characteristic of the invention are set forth with particularity in the appended claims. The invention itself, however, together with further objects and advantages thereof can best be understood by reference to the following description taken in connection with the accompanying drawings in which Fig. 1 is a block diagram showing the general arrangement of the invention in which the apparatus for controlling the rate of increase in gain is shown in ordinary lining and the additional apparatus controlling the initial value is shown in heavy lining; Fig. 2 is a circuit arrangement for controlling the rate of increase of receiver gain; Fig. 3 is a circuit arrangement for controlling the initial setting of the receiver gain; and Fig. 4 is a combination of Figs. 2 and 3 in greater detail.

In Fig. 1 the radar pulse echoes available at the output of receiver 1 pass through a conventional intermediate frequency amplifier 2 and then through a video amplifier 3 to a conventional type of cathode ray tube indicator, not shown, for displaying the pulse echoes. The gain of the amplifier 2 is varied by a sweep generator 4 which is driven by synchronizing pulses 5 from the transmitter, not shown, and available at terminal 6. The initial value of gain from which the sweep commences is established by clutter control circuit 33. This circuit integrates a sampled portion of the output of the video amplifier 3 to yield a control voltage which effects operation of the sweep generator 4. The timing circuit 27 controls the time of sampling of the video amplifier output. Following the adjustment in initial value of gain, output signals of predetermined amplitude from video amplifier 3 adjust the slope of the sweep signal provided by generator 4 so that the rate of gain variation is under the control of such output signals.

The manner in which the slope of the sweep voltage is varied is shown in Fig. 2, in which condenser 7 is a sweep condenser across which voltage sweeps are generated and applied to the amplifier 2 for the purpose of effecting swept gain. This figure represents a portion of Fig. 1 shown in ordinary lines, as contrasted with that represented by heavy lining. Initially, negative synchronizing pulses are applied to the terminal 6 and thence through the condenser 8, potentiometer 9 and through the diode 10 so as to discharge the condenser 7. The level at which these pulses pass and hence the amount by which condenser 7 is discharged is determined by adjustment of the potentiometer 9. The condenser 7 will then charge through the resistance 11, diode 12 and the resistance 13 to B+ potential and this will generate the sweep voltage.

The main feature of the present invention resides in controlling the rate of recharge of the condenser 7. The slope of the sweep voltage is made steeper than normally necessary and the necessary waveform is obtained by retarding the voltage change by means of an additional electron discharge device 14 connected in shunt with the diode 12 and condenser 7. Signals from video amplifier 3 are applied over lead 15 to grid 16 of device 14. It is arranged that signals from slightly above noise level reduce the voltage at anode 17 of device 14 to prevent charging of condenser 7. In the presence of any signals at all, therefore, the grids of the amplifier 2 are held negatively. When the resulting signals available over lead 15 fall to noise level, charging of condenser 7 is permitted until signals are again received and further delay to the charging introduced. The net result is that the swept gain is automatically varied from point to point during each sweep and follows variations in the sea clutter law.

In Fig. 3 condenser 7 is again the sweep condenser across which the swept gain voltage sweeps are generated and applied to the intermediate frequency amplifier 2. This is again initially discharged by negative synchronizing pulses applied from the transmitter to the terminal 6 and acting through the diode 10 on the top plate of the condenser 7. At the end of the synchronizing pulse, the condenser 7 is allowed to recharge through the resistance 18 to B+ potential, the diode 12, as shown in Fig. 2, being omitted for simplification. Diode 19 acts as a clamp limiting the positive excursion of the sweep voltage. This recharging of condenser 7 generates the sweep voltage. In order to vary the initial gain of the receiver, the initial amplitude of the swept gain voltage is varied by varying the bias applied to the cathode of diode 10. This is effected by connecting the cathode 20 of diode 10 through a resistance 21 to the top plate of a condenser 22, the voltage across which condenser is varied in accordance with the time integral of the signals received over relatively short ranges, for example over the first three microseconds after the transmitter pulse. The voltage across 22 is controlled by connecting it through resistor 23 to a source of B+ voltage for charging and at the same time connecting it to a discharging circuit comprising the electron discharge devices 24 and 25 in series. The grid 26 of device 24 is fed with positive-going signals available over lead 15 from the video amplifier and is rendered conductive to an extent dependent upon these signals. The device 25 acts as an electronic switch. The synchronizing pulses applied to the terminal 6 also trip a timing circuit 27 which applies a positive-going voltage over lead 28 to the grid 29 of device 25 for a short interval of time so as to render this valve conductive. During this period the discharge circuit for condenser 22 is completed and, as will be appreciated, the amount of discharge which occurs will depend upon the signals from the video amplifier applied to grid 26 of device 24.

With clutter available over lead 15 just at noise level, the charge and discharge of condenser 22 should just balance. If the clutter falls below noise level, device 24 does not conduct, the upper plate of condenser 22 goes slowly positive and the amplitude of the swept gain waveform is reduced until there is sufficient clutter to operate device 24. If, on the other hand, clutter rises much above noise level, device 24 conducts more heavily and condenser 22 goes slowly negative, increasing the amplitude of the sweep voltage effecting swept gain.

It will be appreciated that with this arrangement the biasing of the cathode 20 of diode 10 will depend upon the time integrals of the signals over the initial short time that device 25 is conducting, for example three microseconds, and in order to ensure that large obstacles such as buoys do not swamp the effect of sea clutter the signals causing the discharge of condenser 22 are limited. This is accomplished by arranging that device 24 passes grid current when the signal level rises very slightly above noise level. It will also be appreciated that since the amplitude of the swept gain voltage depends upon the voltage of condenser 22 this will, of course, depend upon the clutter encountered during the preceding trace or traces.

In the arrangement of Fig. 4, which includes the features of Figs. 2 and 3 in somewhat greater detail, the condenser 7 is replaced by condensers 30 and 31 in series, forming a potential divider for reducing the voltage applied to the intermediate frequency amplifier. These condensers are again initially discharged by synchronizing pulses applied to the terminal 6 and rendering the diode 10 conductive, the effectiveness of the discharge path being determined by the bias applied to 10 which in turn depends upon the voltage across the reservoir condenser 22. The discharge path for the condenser 22 is again formed by the devices 24 and 25 in series, and in this case the periods of conductivity of the valve 25 are determined by a flip-flop circuit 32 which constitutes the "timer" shown in the previous figures. This, as shown, has a cathode follower output so as to drive device 25 into grid current and so enable it to form a relatively large anode current for a small anode voltage.

While a specific embodiment has been shown and described it will be understood that various modifications may be made and developed departing from the invention. The appended claims are, therefore, intended to cover any such modifications within the true spirit and scope of the invention.

What I claim as new and desire to secure by Letters Patent of the United States is:

1. In a radar equipment, means for generating a recurrent sweep voltage which is applied to the radar receiver for varying the gain thereof with time, means for sampling a portion of said receiver output, means for integrating said sampled portion and means for varying the initial amplitude of said sweep voltage in accordance with said integrated portion.

2. In a radar equipment having means for generating a recurrent sweep voltage which is applied to the radar receiver for varying the gain thereof with time, means for automatically varying the initial amplitude of each recurrence of said sweep voltage in accordance with a sampled portion of the output of said receiver, and means for automatically and continuously varying the slope of said sweep voltage in accordance with the continuous output of said receiver.

3. In combination with a radar receiving equipment having means for generating a recurrent sweep voltage timed with respect to the transmission of radar pulses for varying the gain of the radar receiver with time, means timed with respect to said radar pulse transmissions for sampling only a portion of said receiver output, means for establishing the initial amplitude of said sweep voltage in accordance with said sampled output, and means for substantially continuously controlling the instantaneous value of the slope of said sweep voltage in accordance with the instantaneous output of said receiver.

4. In combination with a radar receiving equipment having means for generating a recurrent sweep voltage timed with respect to the transmission of radar pulses for varying the gain of the radar receiver with time, means timed with respect to said radar pulse transmissions for sampling only a portion of said receiver output, means for controlling the initial amplitude of said sweep voltage in accordance with said sampled output, means for continuously controlling the instantaneous slope of said sweep voltage in accordance with the continuous output of said receiver, and means for limiting the maximum amplitude of said sweep voltage.

5. In combination with a radar receiving equipment having means for generating a recurrent sweep voltage timed with respect to the transmission of radar pulses for varying the gain of the radar receiver with time, means timed with respect to said radar pulse transmissions for sampling only a portion of said receiver output, a storage circuit, means for varying the charge on said storage circuit in accordance with said sampled portion, means for controlling the initial amplitude of said sweep voltage in accordance with the charge on said storage circuit, and means for continuously controlling the instantaneous slope of said sweep voltage in accordance with the instantaneous output of said receiver.

6. A gain control system for a wave-signal receiver comprising an energy-storage device, charging and discharging circuits for said device including means for altering the amount of charge in said device in one sense during spaced intervals of time and in the other sense during operating intervals between said spaced intervals of time, means for controlling the gain of said receiver in accordance with the instantaneous values of energy charge in said device to vary said gain with time, and means for controlling the charge in said device in accordance with output signals from said receiver.

7. A gain control system for a wave-signal receiver comprising an energy-storage device, charging and discharging circuits for said device, one of said circuits including means for altering the amount of charge in said device in one sense during spaced intervals of time and the other of said circuits including an impedance element of adjustable impedance value for altering the amount of charge in said device in the other sense and at a controllable rate during operating intervals between said spaced intervals of time, means for controlling the gain of said receiver in accordance with instantaneous values of energy charge in said device to vary said gain with time, and means for adjusting the impedance value of said impedance element in response to output signals from said receiver.

8. A gain control system for a wave-signal receiver comprising a storage condenser, a source of charging potential, a charging circuit coupling said condenser to said source, an electron discharge device having an anode, a cathode and a control electrode, the anode-cathode current path of said device being included in said charging circuit for providing therein an adjustable impedance, a control electrode-cathode circuit for said discharge device supplied with output signals from said receiver for adjusting the anode-cathode impedance of said device to control the charging rate of said condenser in accordance with said output signals, means for periodically discharging said condenser, and means for controlling the gain of said receiver in accordance with instantaneous values of charge on said condenser to vary said gain with time and at a rate dependent upon said output signals.

9. A gain control system for a wave-signal receiver comprising an energy-storage device, charging and discharging circuits for said device including means for altering the amount of charge in said device in one sense during spaced intervals of time and for altering the amount of charge in said device in the opposite sense during operating intervals between said spaced intervals of time, means for controlling the gain of said receiver in accordance with instantaneous values of energy charge in said device to vary said gain with time, and means for controlling one of said circuits in response to output signals from said receiver to limit the amount of charge variation in said device in accordance with said output signals.

10. A gain control system for a wave-signal receiver comprising an energy-storage device, charging and discharging circuits for said device including means for altering the amount of charge in said device in one sense during spaced intervals of time and for altering the amount of charge in said device in the opposite sense during operating intervals between said spaced intervals of time, means for controlling the gain of said receiver in accordance with instantaneous values of energy charge in said device to vary said gain with time, means for sampling the output signal from said receiver during predetermined intervals of time, integrating means coupled to said sampling means for deriving a control signal representing a time integration of the amplitude of output signals from said receiver occurring during said predetermined intervals of time, and means coupling said integrating means to one of said circuits for controlling the charge in said energy-storage device in response to said control signal.

11. A gain control system for a wave-signal receiver comprising a storage condenser, a source of charging potential, a charging circuit coupling said condenser to said source for charging said storage condenser during spaced intervals of time, a discharge circuit for said storage condenser including an integrating condenser for determining the amount of discharge of said storage condenser during operating intervals between said spaced intervals, means for applying output signals from said receiver to said integrating condenser during predetermined intervals of time to maintain therein a charge having a value representing a time integration of the amplitudes of said output signals occurring during said predetermined intervals of time, and means for controlling the gain of said receiver in accordance with instantaneous values of charge on said storage condenser to vary said gain with time and to an extent dependent upon said output signals occurring within said predetermined intervals of time.

12. A gain control system for a wave-signal receiver comprising a pair of condensers, a source of charging potential coupled to one of said condensers for applying a charge thereto, a first electron discharge device including an anode, a cathode and a control electrode, the anode-cathode path of said device being connected to said one condenser to provide a discharge path therefor of adjustable impedance, a control electrode-cathode circuit for said device supplied with output signals from said receiver to control the impedance presented by said device, means for disabling said device during operating intervals exclusive of predetermined operating intervals whereby the amplitudes of output signals from said receiver occurring during said predetermined intervals are effectively integrated by said one condenser to provide a control potential, a charging circuit coupling the other of said condensers to said source and including a second electron discharge device having an anode, a cathode and a control electrode, the anode-cathode current path of said second device being connected to said other condenser, a control electrode-cathode circuit for said second device supplied with said output signals from said receiver for adjusting the anode-cathode impedance of said second device to control the charging rate of said other condenser in accordance with said output signals, a discharge circuit for periodically discharging said other condenser including said one condenser to limit the discharge of said other condenser in accordance with the magnitude of said control potential, and means for controlling the gain of said receiver in accordance with the instantaneous values of charge on said storage condenser to vary said gain with time at a rate dependent upon output signals from said receiver and to an extent dependent upon said output signals occurring during said predetermined intervals of time.

13. In a pulse echo system comprising a pulse echo receiver, means for generating a recurrent sweep signal which is applied to the pulse echo receiver for varying the gain thereof with time, means for sampling a portion of the output of said receiver at the recurrence rate of said sweep signal, and means responsive to each sampled output for varying an amplitude characteristic of said sweep signal at the recurrence rate of said sweep signal.

14. In a pulse echo system comprising a pulse echo receiver, means for generating a recurrent sweep signal which is applied to the pulse echo receiver for varying the gain thereof with time, and means responsive to the instantaneous echo output of said pulse echo receiver for automatically varying the instantaneous rate of change of said sweep signal in accordance with the echo output of said pulse echo receiver.

References Cited in the file of this patent
UNITED STATES PATENTS

| | | |
|---|---|---|
| 2,422,334 | Bedford | June 17, 1947 |
| 2,433,667 | Hollingsworth | Dec. 30, 1947 |
| 2,445,584 | Ramo | July 20, 1948 |
| 2,449,985 | Gloess | Sept. 28, 1948 |
| 2,474,875 | White | July 5, 1949 |
| 2,482,544 | Jacobsen | Sept. 20, 1949 |
| 2,498,381 | Smith | Feb. 21, 1950 |
| 2,532,347 | Stodola | Dec. 5, 1950 |
| 2,538,028 | Mozley | Jan. 16, 1951 |
| 2,562,309 | Fredrick et al. | July 31, 1951 |
| 2,602,922 | Maynard et al. | July 8, 1952 |